(12) United States Patent
Agiomyrgiannakis et al.

(10) Patent No.: US 10,720,146 B2
(45) Date of Patent: Jul. 21, 2020

(54) DEVICES AND METHODS FOR A SPEECH-BASED USER INTERFACE

(71) Applicant: Google LLC, Mountain View, CA (US)

(72) Inventors: Ioannis Agiomyrgiannakis, London (GB); Fergus James Henderson, Twickenham (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/874,051

(22) Filed: Jan. 18, 2018

(65) Prior Publication Data

US 2018/0144737 A1 May 24, 2018

Related U.S. Application Data

(63) Continuation of application No. 14/711,264, filed on May 13, 2015, now abandoned.

(51) Int. Cl.
*G10L 13/033* (2013.01)
*G06F 3/16* (2006.01)
*G10L 13/10* (2013.01)
*G10L 21/013* (2013.01)

(52) U.S. Cl.
CPC ............ *G10L 13/033* (2013.01); *G06F 3/167* (2013.01); *G10L 13/10* (2013.01); *G10L 2021/0135* (2013.01)

(58) Field of Classification Search
CPC ............... G10L 13/033; G10L 13/10; G10L 2021/0135; G06F 3/167
USPC ......................................... 704/258
See application file for complete search history.

(56) References Cited

U.S. PATENT DOCUMENTS

| | | | |
|---|---|---|---|
| 7,333,933 B2 | 2/2008 | Brennan et al. | |
| 7,689,421 B2 | 3/2010 | Li et al. | |
| 8,374,874 B2 | 2/2013 | Cross, Jr. | |
| 9,330,720 B2 | 5/2016 | Lee | |
| 2008/0091428 A1 | 4/2008 | Bellegards | |
| 2008/0167876 A1* | 7/2008 | Bakis | G10L 13/08 704/260 |
| 2008/0291325 A1 | 11/2008 | Teegan | |
| 2009/0006096 A1 | 1/2009 | Li | |

(Continued)

OTHER PUBLICATIONS

Benoit, C., Grice, M., & Hazan, V., "The SUS test: A method for the assessment of text-to-speech synthesis intelligibility using Semanitically Unpredictable Sentences." Speech Communication, 18(4), pp. 381-392, 1996.

(Continued)

*Primary Examiner* — Bharatkumar S Shah
(74) *Attorney, Agent, or Firm* — Honigman LLP; Brett A. Krueger; Grant Griffith

(57) ABSTRACT

A device may identify a plurality of sources for outputs that the device is configured to provide. The plurality of sources may include at least one of a particular application in the device, an operating system of the device, a particular area within a display of the device, or a particular graphical user interface object. The device may also assign a set of distinct voices to respective sources of the plurality of sources. The device may also receive a request for speech output. The device may also select a particular source that is associated with the requested speech output. The device may also generate speech having particular voice characteristics of a particular voice assigned to the particular source.

19 Claims, 6 Drawing Sheets

(56) References Cited

U.S. PATENT DOCUMENTS

| | | | |
|---|---|---|---|
| 2009/0055186 A1 | 2/2009 | Lance et al. | |
| 2009/0175424 A1* | 7/2009 | Andrassy | G06F 21/32 |
| | | | 379/88.02 |
| 2009/0254345 A1 | 10/2009 | Fleizach | |
| 2010/0196861 A1 | 8/2010 | Lunner | |
| 2010/0266112 A1 | 10/2010 | Burstrom | |
| 2010/0302042 A1* | 12/2010 | Barnett | G08B 19/00 |
| | | | 340/573.1 |
| 2011/0066438 A1* | 3/2011 | Lindahl | G10L 13/033 |
| | | | 704/258 |
| 2012/0035933 A1 | 2/2012 | Conkie | |
| 2012/0265533 A1* | 10/2012 | Honeycutt | G10L 13/033 |
| | | | 704/260 |
| 2014/0222424 A1 | 8/2014 | Hartford et al. | |

OTHER PUBLICATIONS

Hinterleitner, F., Norrenbrock, C., Moller, S., & Heute, U., "Text-to-speech synthesis." In S. Moller & A. Raake (Eds.), Quality of Experience: Advanced Concepts, Applications and Methods. Cham, Switzerland: Springer International D Publishing, pp. 179-193, 2014.

Picart, B., Drugman, T., & Dutoit, T., "Assessing the Intelligibility and Quality of HMM-based Speech Synthesis with a Variable Degree of Articulation". In Proc. of the Listening Talker Workshop 2012, Edinburgh, UK, May 2012.

Suendermann, D., Hoege, H., Bonafonte, A., Ney, H., & Hirschberg, J., "TC-Star: Cross-Language Voice Conversion Revisited". In Proc. of the TC-Star Workshop 2006, Barcelona, Spain, Jun. 2006.

* cited by examiner

Computer Program Product 600

Signal Bearing Medium 602

Programming Instructions 604

| Computer Readable Medium 606 | Computer Recordable Medium 608 | Communications Medium 610 |

FIG. 6

DEVICES AND METHODS FOR A SPEECH-BASED USER INTERFACE

CROSS-REFERENCE TO RELATED APPLICATION

This application is a continuation of U.S. application Ser. No. 14/711,264, filed May 13, 2015, the contents of which are incorporated by reference herein.

BACKGROUND

Unless otherwise indicated herein, the materials described in this section are not prior art to the claims in this application and are not admitted to be prior art by inclusion in this section.

Speech-based user interfaces (SUIs) allow computing devices to interact with users through speech. For example, an SUI may employ various speech processing technologies such as automatic speech recognition (ASR) to receive information or instructions spoken by a user. Further, the SUI may employ speech synthesis technologies such as text-to-speech (TTS) to provide information to the user in the form of computer-generated speech.

SUIs may facilitate various modes of human-machine interaction including a hands-free mode of operation, a multi-modal mode of operation, and an accessibility mode of operation, among other possibilities. As an example of hands-free operation, a navigation application in a computing device may provide driving directions to a driver through computer-generated speech. As an example of multi-modal operation, a test-taking application in the computing device may provide visual instructions to a test-taker along with speech prompts for time remaining in the test. As an example of accessibility operation, an operating system or a screen-reader application may recite or describe contents of a display of the device to a visually impaired user or any other user operating the device in the accessibility mode.

To facilitate speech synthesis, a computing device typically accesses a corpus of recorded speech from a speaker that has a particular voice (e.g., male, female, child, adult, high-pitch, low-pitch, etc.). Alternatively, the corpus may include representations of the recorded speech (e.g., acoustic feature parameters, etc.).

Typically, a computing device may employ TTS as a system service available to at least some applications in the computing device. By way of example, an application in the device may provide text to the TTS system. In turn, the TTS system may generate synthetic speech by concatenating one or more recorded speech sounds to recite the text. Alternatively, for instance, the TTS system may generate the synthetic speech for the text by modulating signals to a speaker of the device according to stored acoustic feature parameters.

SUMMARY

In one example, a method is provided that includes a device identifying a plurality of sources for outputs that the device is configured to provide. The device may include one or more processors. The plurality of sources includes at least one of a particular application in the device, an operating system of the device, a particular area within a display of the device, or a particular graphical user interface (GUI) object. The method also includes assigning a set of distinct voices to respective sources of the plurality of sources. A voice assigned to one source is characterized by voice characteristics different from voice characteristics of other voices assigned to other sources. The method also includes receiving a request for speech output. The method also includes selecting, from within the plurality of sources, a particular source that is associated with the requested speech output. The method also includes generating, for the requested speech output, speech having particular voice characteristics of a particular voice assigned to the particular source.

In another example, a device is provided that comprises one or more processors and data storage storing instructions executable by the one or more processors. The instructions cause the device to identify a plurality of sources for outputs that the device is configured to provide. The plurality of sources includes at least one of a particular application in the device, or an operating system of the device. The instructions also cause the device to assign a set of distinct voices to respective sources of the plurality of sources. A voice assigned to one source is characterized by voice characteristics different from voice characteristics of other voices assigned to other sources. The instructions also cause the device to receive a request for speech output. The instructions also cause the device to select, from within the plurality of sources, a particular source that is associated with the requested speech output. The instructions also cause the device to generate, for the requested speech output, speech having particular voice characteristics of a particular voice assigned to the particular source.

In yet another example, a computer readable medium is provided. The computer readable medium may have instructions stored therein that, when executed by a computing device, cause the computing device to perform functions. The functions include identifying a plurality of sources for outputs that the computing device is configured to provide. The plurality of sources include at least one of a particular application in the computing device, an operating system of the computing device, a particular area within a display of the computing device, or a particular graphical user interface (GUI) object. The functions also include assigning a set of distinct voices to respective sources of the plurality of sources. A voice assigned to one source is characterized by voice characteristics different from voice characteristics of other voices assigned to other sources. The functions also include receiving a request for speech output. The functions also include selecting, from within the plurality of sources, a particular source that is associated with the requested speech output. The functions also include generating, for the requested speech output, speech having particular voice characteristics of a particular voice assigned to the particular source.

In still another example, a system is provided that comprises a means for identifying a plurality of sources for outputs that a device is configured to provide. The plurality of sources includes at least one of a particular application in the device, an operating system of the device, a particular area within a display of the device, or a particular graphical user interface (GUI) object. The system further comprises a means for assigning a set of distinct voices to respective sources of the plurality of sources. A voice assigned to one source is characterized by voice characteristics different from voice characteristics of other voices assigned to other sources. The system further comprises a means for receiving a request for speech output. The system further comprises a means for selecting, from within the plurality of sources, a particular source that is associated with the requested speech output. The system further comprises a means for generating, for the requested speech output, speech having particular voice characteristics of a particular voice assigned to the particular source.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 6 depicts a computer-readable medium configured according to an example embodiment.

DETAILED DESCRIPTION

Figure 1:
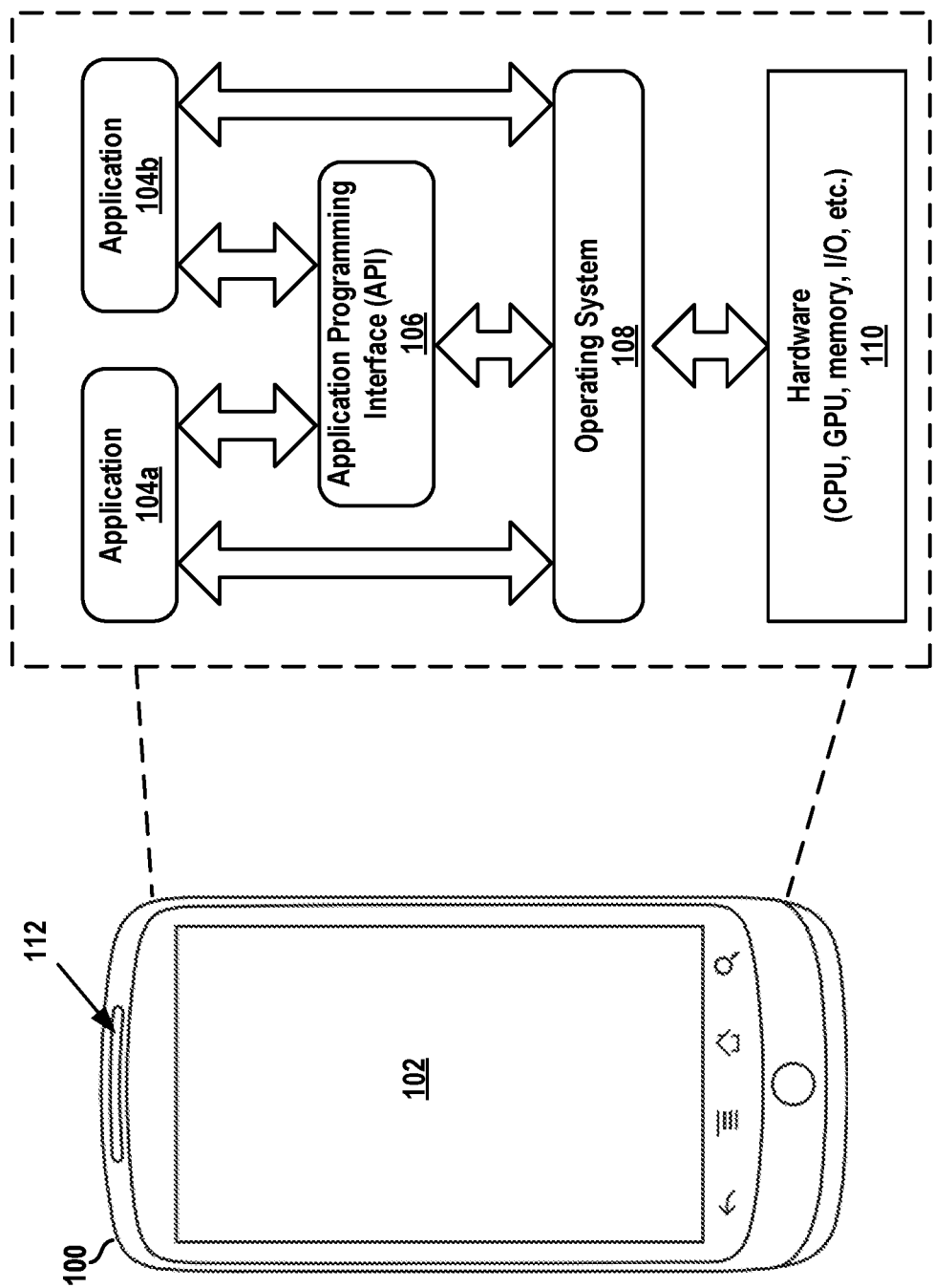
FIG. 1 illustrates a device, according to an example embodiment.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

In some instances, a computing device (e.g., desktop computer, laptop, smartphone, tablet, wearable device, server, etc.) may be configured to provide outputs from multiple sources such as different applications, operating systems, widgets, or any other user interface (UI) element. For instance, an email application may output contents of an email, a calendar application may output a notification for an upcoming appointment, an operating system may output a notification for battery level, etc.

Even outputs from the same source may have varying contexts. In one instance, output from an email application may include text from several authors. In another instance, output from a word-processing application may include text having different font characteristics (e.g., font style, size, bold, italic, color, capitalized, quoted, etc.). In yet another instance, output from a screen-reader application may include a caption of a button and a value of a sliding bar. As a variation of this instance, the button may be positioned in a particular area of a display (e.g., top of display) and the sliding bar may be positioned at a different area (e.g., bottom of display). In still another instance, output from a stock-screening application may include a listing of stocks that are associated with different degrees of market performance or that are arranged according to some factor.

The context of the outputs may also depend on the status of the device or the source itself, among other possibilities. In one instance, a download management application may output the percentage remaining for a file being downloaded in different ways (e.g., font characteristics, etc.) according to network conditions. In another instance, a sports application may output sports results in a particular format based on the version of the application on the device or the day of the week (e.g., Sunday games may have a special format, etc.). In yet another instance, an image processing application may process images in a different manner depending on remaining battery power, and may output a notification when the processing is complete in different ways (e.g., different colors, etc.) depending on the manner of processing.

Other scenarios are possible as well where outputs provided by the computing device have different contexts or sources. On one hand, for at least some of the instances above, the contextual (and source) information associated with the outputs may be effectively conveyed to a user if the outputs are provided visually (e.g., using a display, etc.). For example, the contextual (and source) information may be transmitted to a user by adjusting colors, adjusting font characteristics, arranging the information, adjusting display brightness, etc. On the other hand, transmitting the contextual (and source) information to a user using speech output may involve additional speech processing, in accordance with the present disclosure.

Within examples, methods and systems are provided for assigning distinguishable voice characteristics to output speech according to a source or context of the output speech. In one example, a device herein may provide synthetic speech having a particular voice for a first application (e.g., email, etc.) and synthetic speech having another voice for a second application (e.g., calendar, etc.). In another example, the device may provide speech having different voices for output from the same application. For instance, in a text-to-speech application, a pitch, speed, quality (e.g., harsh voice, soft voice, etc.), etc., of synthetic speech may be adjusted for text that is bold compared to text that is italic, etc., even if the text is from the same application. Other modifications are possible as well and are described in greater detail within exemplary embodiments of the present disclosure. Further, within examples, methods and devices are provided for selection of distinct voices from within a plurality of available voices. In some examples, the voices accessible to a device may be limited. For instance, a speech corpus may include recorded speech from only one or few speakers due to memory limitations. Accordingly, within examples, methods and systems are provided for generating additional voices based on morphing or transforming available voices.

Through this process, in some examples, a user of the computing device may perceive the source or context of generated speech without additional output (e.g., additional speech specifying the source/context, etc.) from the computing device. For instance, adjusting the voice characteristics of generated speech output in accordance with the present method may convey the identity of the application providing the output without explicitly announcing the identity of the application (e.g., "you have an email" followed by the contents of the email, etc.), the source of the output, or the context of the output (e.g., "capitalized text" followed by a pronunciation of the text, etc.).

Referring now to the figures, FIG. 1 illustrates a device 100, according to an example embodiment. The device 100 may include a display 102, applications 104a and 104b, an application programming interface (API) 106, an operating system 108 for executing instructions to operate hardware 110 of the device 100, and an audio output apparatus 112. Although device 100 is illustrated in FIG. 1 as a smartphone, aspects of this disclosure are applicable to other computing devices such as personal computers, laptops, tablet computers, servers, wearable devices, etc.

The display 102 may include a light emitting diode (LED) display, a liquid crystal display (LCD), a cathode ray tube (CRT) display, an e-ink screen, and/or any other suitable device for presenting a graphical user interface and/or visual information to the user of the device 100. Although illustrated in FIG. 1 that the display 102 is included in the device 100, in some examples, the display 102 may be implemented as an external display coupled to the device 100. For example, the display 102 may be an external monitor or projection screen configured to display the visual information provided by the device 100.

Each of the applications 104a and 104b may include instructions that when executed cause the device 100 to perform specific tasks or functions. The applications 104a and 104b may be native applications (i.e., installed by a manufacturer of the device 100 and/or a manufacturer of the operating system 108) or may be a third-party application installed by a user of the device 100. A non-exhaustive list of example applications includes: a media player application that accepts media files as inputs and generates corresponding video and/or audio to output device(s) (e.g., the display 102, audio output apparatus 112, etc.); an e-reader application which accepts electronic documents (e.g., books, magazines, etc.) as an input and presents the content of the documents via the display 102 or via the audio output apparatus 112; a feed reader that accepts feeds delivered over a network (e.g., RSS feeds and/or feeds from social network sites) as inputs and presents the feeds via the display 102 or the audio output apparatus 112; a map application that displays a map via the display 102 or the audio output apparatus 112; a note-taking application, a bookmarking application, a word processing application, spreadsheet application, and/or presentation application that accepts specifically formatted files as inputs and presents them via the display 102 or the audio output apparatus 112 for viewing and/or editing. Other example applications are possible.

The device 100 may also include one or more APIs, such as the API 106. The API 106 may function as an interface between the operating system 108 and the applications 104a and 104b. For example, the API 106 may provide the interface for receiving requests having a particular format from the application 104a and/or 104b, and may manage provision of the requests to the operating system 108. Further, in some examples, the API 106 may be configured to process requests that are directed to particular functions of the device 100, such as operation of the display 102 or the hardware 110. In other examples, the API 106 may be configured to process requests for any combination of functions of the device 100. In one example, the API 106 may include a text-to-speech (TTS) interface for receiving text from the applications 104a-104b and generating speech output that corresponds to the text (e.g., via the audio output apparatus 112). Additionally or alternatively, the functions of the API 106 may be performed by the operating system 108. For example, the applications 104a and/or 104b may be configured to interface directly with the operating system 108.

The operating system 108 may interact with and manage the display 102, the hardware 110, and the audio output apparatus 112 to provide services for the applications 104a and 104b. For example, the application 104a may request the operating system 108 to utilize the hardware 110 to scan for wireless devices in an environment of the device 100.

The hardware 110 may include, for example, a central processing unit (CPU), a graphics processor (GPU), memory, a communication interface, a power unit, an input/output (I/O) interface, user input device(s), and output device(s). Components of hardware 110 may be controlled by instructions contained in applications 104a and 104b, the API 106, and/or the operating system 108.

The central processing unit (CPU) may be operable to effectuate the operation of the device 100 by executing instructions stored in memory or disk storage. Such instructions may include the operating system 108 and the applications 104a and 104b, for example. The CPU may, for example, comprise a single or multi-core processor, an application specific integrated circuit (ASIC), field programmable gate array (FPGA), and/or any other suitable circuitry.

The graphics processor may be operable to generate a video stream for output to the display 102 based on instructions and/or data received from the CPU. Additionally or alternatively, the graphics processor may be operable to perform animations of virtual objects on the display 102. Thus, data structures corresponding to images to be displayed on the display 102 may be stored to and read from the memory or disk storage by the CPU. The CPU may convey such data structures to the graphics processor via a standardized application programming interface (API) such as, for example, the API 106, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory. Program memory may store instructions executable by the CPU to effectuate operation of the operating system 108 and the applications 104a and 104b. Runtime memory may store data generated or used during execution of the operating system 108 or applications 104a and 104b.

The communication interface may be operable to allow wired (e.g., Ethernet, Universal Serial Bus (USB), etc.) and/or wireless (e.g., Wi-Fi, Bluetooth, near-field, Infrared (IR), etc.) connectivity between the device 100 and one or more external devices. To that end, the communication interface may include a wireless receiver configured to receive and/or manipulate wireless signals, and/or a wireless transmitter configured to transmit and/or manipulate wireless signals. In some examples, the wireless receiver and the wireless transmitter can be implemented as a single circuit that performs both transmit and receive functions. The communication interface may also include one or more antennas (e.g., dipole, etc.) coupled to the various transmitter, receiver, and/or transceiver circuitry to broadcast and/or receive the wireless signals.

The input/output (I/O) interface may be operable to receive signals from the input device(s), and provide corresponding signals to the CPU and/or the graphics processor. The input device(s) may include, for example, a mouse, a touchpad, a motion sensor, a trackball, a voice recognition device, a keyboard, or any other suitable input device which enables a user to interact with the device 100. The output devices may include, for example, the display 102, additional displays, the audio output apparatus 112, and/or additional audio output apparatuses.

The audio output apparatus 112 may include any device suitable for outputting sound content from the device 100. For example, the audio device 110 may include any combination of headphones, speakers, and/or output interfaces to external headphones/speakers.

In some examples, the device 100 may include more or less components than those shown in FIG. 1. In one example, the device 100 may not include any or some of the applications 104*a*, 104*b*, and the API 106. In another example, the hardware 110 may not include a GPU. Other examples are possible as well.

Figure 2:
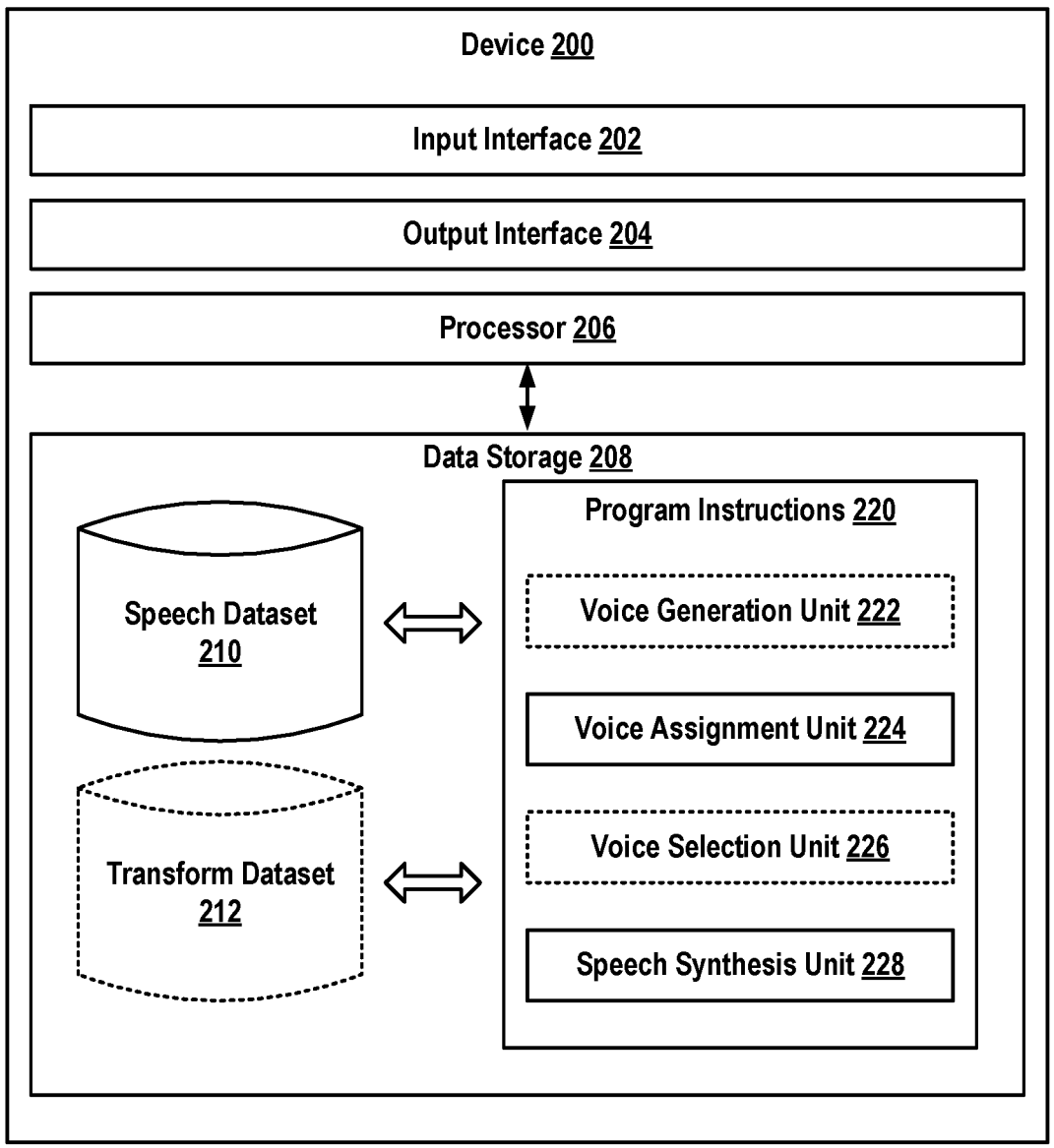
FIG. 2 is a block diagram of a device, according to an example embodiment.

FIG. 2 is a block diagram of a device 200, according to an example embodiment. The device 200 may be similar to the device 100. The device 200 includes an input interface 202, an output interface 204, a processor 206, and data storage 208.

The device 200 may include a computing device such as a smart phone, digital assistant, digital electronic device, body-mounted computing device, personal computer, server, or any other computing device configured to execute program instructions 220 included in the data storage 208 to operate the device 200. In some examples, the device 200 may include additional components (not shown in FIG. 2), such as a camera, an antenna, or any other physical component configured, based on the program instructions 220 executable by the processor 206, to operate the device 200. The processor 206 included in the device 200 may comprise one or more processors configured to execute the program instructions 220 to operate the device 200.

The input interface 202 may include an audio input device such as a microphone or any other component configured to provide an input signal comprising audio content associated with speech to the processor 206. Additionally or alternatively, the input interface 202 may include any other input device such as a keyboard, mouse, touchscreen, or any other component configured to provide an input signal to the processor 206.

The output interface 204 may include an audio output apparatus, such as a speaker, headphone, or any other component configured to receive an output signal from the processor 206, and output speech sounds that may indicate synthetic speech content based on the output signal. Additionally or alternatively, the output interface 204 may include a display such as a liquid crystal display (LCD), light emitting diode (LED) display, projection display, cathode ray tube (CRT) display, or any other display configured to provide visual output. Other output devices are possible as well (e.g., haptic output, etc.).

Additionally or alternatively, the input interface 202 and/or the output interface 204 may include network interface components configured to, respectively, receive and/or transmit the input signal and/or the output signal described above. For example, an external computing device (e.g., server, etc.) may provide the input signal (e.g., speech content, linguistic content, etc.) to the input interface 202 via a communication medium such as Wi-Fi, WiMAX, Ethernet, Universal Serial Bus (USB), or any other wired or wireless medium. Similarly, for example, the external computing device may receive the output signal from the output interface 204 via the communication medium described above.

The data storage 208 may include one or more memories (e.g., flash memory, Random Access Memory (RAM), solid state drive, disk drive, etc.) that include software components configured to provide the program instructions 220 executable by the processor 206 to operate the device 200. Although FIG. 2 shows the data storage 208 physically included in the device 200, in some examples, the data storage 208 or some components included thereon may be physically stored on a remote computing device. For example, some of the software components in the data storage 208 may be stored on a remote server accessible to the device 200. As shown, the data storage 208 may include speech dataset 210 and program instructions 220. In some examples, the data storage 208 may optionally include a transform dataset 212.

The speech dataset 210 includes speech data associated with one or more voices. In some examples, the speech dataset 210 may include a plurality of speech sounds associated with voice characteristics of the one or more voices. For example, the plurality of speech sounds may include recorded speech segments from a speaker that has a particular voice. Further, in some examples, the plurality of speech sounds may also include recorded speech segments from another speaker that has another voice. Alternatively, for example, the speech segments may be synthetic speech sounds that have particular voice characteristics of a particular voice.

Additionally or alternatively, in some examples, the speech dataset 210 may include parametric representations (e.g., acoustic feature parameters) of the plurality of speech sounds. For example, the plurality of speech sounds may be represented in the speech dataset 210 as samples of spectral and/or aperiodicity envelopes that describe the plurality of speech sounds.

The acoustic feature parameters, for example, may include a parameterization of spectral/aperiodicity aspects (e.g., spectral envelope, aperiodicity envelope, etc.) for a speech signal that may be utilized to regenerate a synthetic pronunciation of the speech signal. Example spectral parameters may include Cepstrum, Mel-Cepstrum, Generalized Mel-Cepstrum, Discrete Mel-Cepstrum, Log-Spectral-Envelope, Auto-Regressive-Filter, Line-Spectrum-Pairs (LSP), Line-Spectrum-Frequencies (LSF), Mel-LSP, Reflection Coefficients, Log-Area-Ratio Coefficients, deltas of these, delta-deltas of these, a combination of these, or any other type of spectral parameter. Example aperiodicity parameters may include Mel-Cepstrum, log-aperiodicity-envelope, filterbank-based quantization, maximum voiced frequency, deltas of these, delta-deltas of these, a combination of these, or any other type of aperiodicity parameter. Other parameterizations are possible as well such as maximum voiced frequency or fundamental frequency parameterizations among other possibilities.

In some examples, the acoustic feature parameters described above may be sampled at harmonic frequencies of the speech signal. For example, a spectral envelope of the speech signal (e.g., Mel-Cepstrum, Log-spectral-envelope, etc.) may be sampled at the harmonic frequencies and/or any other frequencies (e.g., regular frequencies, irregular frequencies, etc.) of the speech signal.

In some examples, where the speech dataset 210 includes a plurality of speech sounds for a given voice, the device 200 may be configured to determine the acoustic feature parameters for such speech sounds.

In some examples, the plurality of speech sounds (or parameters thereof) in the speech dataset 210 are each assigned to a linguistic term or a linguistic class. The linguistic term (or linguistic class), for example, may include various phonetic features such as phonemes, phones, diphones, triphones, etc.

A phoneme may be considered to be a smallest segment (or a small segment) of an utterance that encompasses a meaningful contrast with other segments of utterances. Thus, a word typically includes one or more phonemes. For example, phonemes may be thought of as utterances of letters; however, some phonemes may represent multiple letters. An example phonemic representation for the English language pronunciation of the word "cat" may be /k/ /ae/ /t/, including the phonemes /k/, /ae/, and /t/ from the English language. In another example, the phonemic representation for the word "dog" in the English language may be /d/ /aw/ /g/, including the phonemes /d/, /aw/, and /g/ from the English language.

Different phonemic alphabets exist, and these alphabets may have different textual representations for the various phonemes therein. For example, the letter "a" in the English language may be represented by the phoneme /ae/ for the sound in "cat," by the phoneme /ey/ for the sound in "ate," and by the phoneme /ah/ for the sound in "beta." Other phonemic representations are possible. As an example, in the English language, common phonemic alphabets may contain about 40 distinct phonemes. In some examples, a phone may correspond to a speech sound. For example, the letter "s" in the word "nods" may correspond to the phoneme /z/ which corresponds to the phone [s] or the phone [z] depending on a position of the word "nods" in a sentence or on a pronunciation of a speaker of the word. In some examples, a sequence of two phonemes (e.g., /k/ /ae/) may be described as a diphone. In this example, a first half of the diphone may correspond to a first phoneme of the two phonemes (e.g., /k/), and a second half of the diphone may correspond to a second phoneme of the two phonemes (e.g., /ae/). Similarly, in some examples, a sequence of three phonemes may be described as a triphone.

Additionally, in some examples, the plurality of speech sounds (or parameters thereof) in the speech dataset 210 may be associated with concatenation features (e.g., linguistic classes, etc.) such as prosodic features, preceding and following phonemes, position of speech sound in syllable, position of syllable in word and/or phrase, position of word in phrase, stress/accent/length features of current/preceding/following syllables, distance from stressed/accented syllable, length of current/preceding/following phrase, end tone of phrase, length of speech sound within the speech signal, etc. By way of example, a pronunciation of the phoneme /ae/ in the word "cat" may be different than a corresponding pronunciation of the phoneme /ae/ in the word "catapult."

In some examples, where speech sounds of the speech dataset 210 are associated with linguistic terms/classes, the device 200 may be configured to synthesize a speech signal by determining a hidden Markov model (HMM) chain that corresponds to at least some of the acoustic feature parameters associated with the speech sounds. For example, an HMM may model a system such as a Markov process with unobserved (i.e., hidden) states. Each HMM state may be represented as a Gaussian distribution, a von Mises distribution, or any other statistical distribution that characterizes statistical behavior of the state. For example, a statistical distribution may include the acoustic feature parameters of a phoneme that corresponds to a given speech sound of the plurality of speech sounds indicated by the speech dataset 210. Additionally, each state may also be associated with one or more state transitions that specify a probability of making a transition from a current state to another state (e.g., based on concatenation features, etc.).

When applied to the device 200, in some examples, the combination of the statistical distributions and the state transitions for each state may define a sequence of acoustic feature parameters that may be processed to generate a synthetic speech output.

The transform dataset 212 may include one or more voice conversion transforms to transform speech sounds (or parameters thereof) having one or more of the voices represented in the speech dataset 210 to speech sounds (or parameters) having one or more additional voices. To that end, a transform may include any combination of filters, weighting functions, frequency-warping functions, or any other signal processing algorithm to modify voice characteristics of a given voice represented in the speech dataset 210 to different voice characteristics of another voice not represented in the speech dataset 210. Through this process, for example, the device 200 may be configured to provide speech having additional voices (and associated voice characteristics) without storing speech sounds (or parameters thereof) for the additional voices in the speech dataset 210. In turn, for example, memory savings may be achieved for the device 200 by storing the transforms in the transform dataset 212 instead of storing additional speech sounds for such additional voices in the speech dataset 210.

In some examples, the transforms in the transform dataset 212 may be determined by the device 200 comparing a sample speech signal with speech sounds (or parameters thereof) in the speech dataset 210 to generate the transform dataset 212. For instance, the device 200 may prompt a user to recite a training text sample, and may then determine the transform dataset 212 by comparing voice characteristics of the user with voice characteristics of speech sounds associated with one or more voices represented in the speech dataset 210. In other examples, the transforms in the transform dataset 212 may be computed by any other device, and stored in the data storage 208 for use by the device 200.

The voice characteristics that vary between two voices may include vocal tract characteristics (e.g., vocal tract length, vocal tract shape, etc.), nasal cavity characteristics, and/or voicing characteristics, among other possibilities. The voicing characteristics, for example, may be associated with a glottal formant or a spectral tilt. The glottal format and/or the spectral tilt may pertain to differences in spectral energy distribution between the two voices.

To compensate for differences in the vocal tract characteristics, in some examples, a transform may include a "warping" component. By way of example, a first speech sound of a first voice may have particular spectral features (e.g., maximums, minimums, etc.) at the frequencies: 1450 Hz, 1600 Hz, and 1750 Hz. Similarly, in the example, a second speech sound of a second voice (generated based on a transform) may have corresponding spectral features at the frequencies: 1455 Hz, 1595 Hz, and 1740 Hz. The difference in the example may be due to differences between the vocal tract characteristics of the first voice and the second voice. Thus, for example, the "warping" component may associate the various frequencies accordingly. Further, for example, to compensate for differences in the nasal cavity characteristics (e.g., spectral nulls at high frequencies, etc.) and/or the voicing characteristics, the transform may include a "weighting" component. In the example above, amplitudes of the acoustic feature parameters (e.g., spectral envelopes, aperiodicity envelopes, etc.) at a particular frequency (e.g., 1750 Hz for the first voice and 1740 Hz for the second voice, etc.) may differ by a factor, and thus the "weighting" component may compensate for such difference. Accordingly, in some examples, the transform may include both the "warping" and the "weighting" components. However, other transforms are possible as well depending on the voice conversion process utilized to generate the transforms in the transform dataset 212.

In some examples, a given transform of the transform dataset 212 may be configured to adjust voice characteristics of only one voice of the voice(s) represented in the speech dataset 210. In other examples, the given transform may be alternatively configured to adjust voice characteristics of more than one voice of the voices represented in the speech dataset 210.

The program instructions 220 comprise various software components including a voice assignment unit 224 and a speech synthesis unit 228. In some examples, the program instructions 220 may optionally include a voice generation unit 222 and a voice selection unit 226. The various software components 222-228 may be implemented, for example, as an application programming interface (API), dynamically-linked library (DLL), or any other software implementation suitable for providing the program instructions 220 to the processor 206.

The voice generation unit 222 may be configured to determine additional voices other than the voice(s) represented in the speech dataset 210. For example, in line with the description of the transform dataset 212, the voice generation unit 222 may utilize the transform dataset 212 to determine speech sounds/parameters that have voice characteristics different from the voice characteristics of speech sounds/parameters of the one or more voices represented in the speech dataset 210.

Additionally or alternatively, in some examples, the voice generation unit 222 may determine additional voices by applying voice morphing parameters to the voice(s) represented the speech dataset 210 and/or the voices determined based on the transform dataset 212. The morphing parameters, for example, may adjust one or more of a tonality, duration, frequency, or quality of a given voice. Tonality modifications, for example, may include adjusting a pitch (e.g., average pitch), pitch contour variance (e.g., melody), or any other (e.g., random) pitch variations of speech sounds associated with a voice. Duration modifications, for example, may include adjusting a speaking rate of one or more speech sounds associated with a voice. Frequency warping modifications, for example, may include linear frequency scaling to simulate vocal tract length changes. Voice quality modifications, for example, may include adjusting harshness of a voice, softness of a voice, creakiness of a voice, or diplophonia of a voice, among other possibilities. Other voice morphing parameters are possible as well. Thus, by applying different voice morphing parameters to existing (or transformed) voices, the voice generation unit 222 may generate additional voices for the device 200 without storing speech sounds for these additional voices, for example.

The voice assignment unit 224 may be configured to assign a set of distinct voices to respective sources of speech outputs that the device 200 is configured to provide. Referring back to FIG. 1 by way of example, the plurality of sources may include the application 104a and the application 104b. Thus, for instance, by assigning a first voice to application 104a and a second voice to application 104b, a user of the device 200 may distinguish between speech outputs from each of these applications by perceiving the different voice characteristics of the generated speech. The set of distinct voices may include voices represented in the speech dataset 210 and/or any of the voices generated by the voice generation unit 222 (e.g., based on the transform dataset 212 and/or voice morphing parameters, etc.). In some examples, the voice assignment unit 224 may be configured to assign more than one of the set of distinct voices to the same source. For instance, the application 104a may provide text having different font characteristics for speech synthesis, and the voice assignment unit 224 may assign a first voice to bold text and a second voice to italicized text, etc. In other examples, the voice assignment unit 224 may assign only one distinct voice for each respective source.

The voice selection unit 226 may be configured to select the set of distinct voices described in the voice assignment unit 224, from within the plurality of voices represented in the speech dataset 210 and/or the additional voices generated by the voice generation unit 222. In line with the discussion above, the plurality of voices available to the device 200 for assignment to different sources of speech output may include many voices depending on the number of voices of the speech dataset 210, the number of transforms of the transform dataset 212, and the number of voice morphing parameters available to the voice generation unit 222. However, in some examples, some of the available voices may be similar, and thus less suitable for distinguishing the different sources (or contexts) of speech outputs provided by the device 200. In turn, for example, the voice selection unit 226 may be configured to select, from within the available voices, a subset having voice characteristics that have a threshold amount of difference in voice characteristics compared to one another. Through this process, for example, a listener may distinguish between a relatively smaller number of voices to perceive the context (or source) of the speech output, thereby reducing the cognitive strain of the listener.

Accordingly, in some examples, the voice selection unit 226 may be configured to determine a similarity metric characterizing similarity between the plurality of available voices. The similarity metric may characterize the similarity between voice characteristics of speech sounds having a first voice and voice characteristics of speech sounds having a second voice.

In some examples, the similarity metric may be based on a subjective comparison between speech sounds having a first voice and speech sounds having a second voice. For instance, similarity mean-of-opinion scores (MOS) may be based on a test where listeners compare a speech sample having voice characteristics of the first voice with a similar speech sample having voice characteristics of the second voice. The listeners, for example, may rate their perception of similarity between the two speech samples and a mean of the ratings (e.g., scores) may be utilized to determine the similarity metric. For example, the similarity MOS scores may be stored in the data storage 208 (e.g., within the speech dataset 210, within the transform dataset 212, within any other dataset, etc.) or in any other remote memory, and the voice selection unit 226 may access the stored similarity MOS scores to determine the similarity metric. Other subjective comparisons are possible as well.

Additionally or alternatively, in some examples, the similarity metric may be based on an objective comparison between the plurality of available voices. In one example, the voice selection unit 226 may compare acoustic feature parameters of voices represented in the speech dataset 210 (and/or voices generated by the voice generation unit 222). In another example, the voice selection unit 226 may compare transforms in the transform dataset 212 to determine a measure of similarity (i.e., the similarity metric) between transformed voices using the different transforms in the transform dataset 212. In both cases, various comparison algorithms are possible, such as distance measurement algorithms among other possibilities. For instance, the voice selection unit 226 may determine differences between respective "warping" and/or respective "weighting" components of different transforms in the transform dataset 212. Other algorithms are possible as well for determining the similarity metric.

Accordingly, the voice selection unit 226 may select the set of distinct voices from within the plurality of available voices, where the similarity metric indicates that similarity between the set of distinct voices is less than a threshold. The selected set of distinct voices may then be utilized by the voice assignment unit 224 for assignment to the plurality of sources of speech output that the device 200 is configured to provide.

Further, in some examples, the voice selection unit 226 may further reduce the number of voices in the set of distinct voices by determining a naturalness metric and/or an intelligibility metric.

The naturalness metric may characterize acoustic transitions between speech segments of a voice that are included in a speech output. By way of example, the device 200 may generate synthetic speech for the word "dog" by combining speech sounds for the phonemes /d/, /aw/, and /g/. In this example, the speech sounds for the three phonemes may be obtained by parsing recorded speech samples where the three phonemes are used in other words, such as "day," "bronze," and "bag." Thus, for example, combining the speech sounds may have a high level of naturalness if the transitions in characteristics such as pitch, duration, pauses, etc., between the parsed samples are lower than a threshold.

The intelligibility metric may characterize cognitive perception of speech sounds having a given voice. Intelligibility may be affected by clarity, explicitness, lucidity, comprehensibility, perspicuity, and precision of the generated speech. For instance, speech having a high level of intelligibility may allow a listener to correctly perceive the intended words recited by the generated speech. By way of example, the device 200 may be configured to generate speech for the words "cat" and "cart." In this example, if the generated speech has a low level of intelligibility, the listener may confuse the two words or may perceive an entirely different word than the two words intended by the generated speech.

In some examples, the naturalness metric and/or the intelligibility metric may be based on subjective tests. For example, naturalness MOS scores and/or intelligibility MOS scores may be provided similarly to the similarity MOS scores. Other subjective tests are possible as well such as the semantically unpredictable sentences (SUS) test for intelligibility and/or naturalness among other possibilities.

In other examples, the naturalness metric and/or the intelligibility metrics may be determined based on objective tests. As an example for an objective test for intelligibility, the acoustic feature parameters of speech sounds in the speech dataset 210 may include a noise representation characterizing aspirates and/or fricatives in the speech sounds. An aspirate may be associated with a characteristic of an exhalation of at least a threshold amount of breath. A fricative may be associated with a characteristic of airflow between two or more vocal tract articulators.

In some examples, speech sounds may include articulation of various speech sounds that involve exhalation of breath. Such articulation may be described as aspiration and/or frication, and may cause noise in the speech signal which may affect the intelligibility of the speech signal. An example aspirate may correspond to the pronunciation of the letter "p" in the word "pie." During articulation of such aspirate, at least a threshold amount of breath may be exhaled by a speaker pronouncing the word "pie." In turn, an audio recording of the pronunciation of the speaker may include breathing noise due to the exhalation.

Further, in some examples, speech sounds may include a fricative that is associated with airflow between two or more vocal tract articulators. A non-exhaustive list of example vocal tract articulators may include a tongue, lips, teeth, gums, palate, etc. Noise due to such fricative speech may also be characterized in the noise representation, to enhance quality of synthesized speech. For example, breathing noise due to airflow between a lip and teeth may be different from breathing noise due to airflow between a tongue and teeth.

Further, for example, the fricative speech sounds may be included in voiced speech and/or unvoiced speech. Voicing is a term used in phonetics and phonology to characterize speech sounds. A voiced speech sound may be articulated by vibration of vocal cords of a speaker. For example, a pronunciation of the letter "z" in the word "zebra" corresponds to the voiced phone [z], and the articulation thereof may cause the vocal cords to vibrate at a particular pitch frequency (e.g., fundamental frequency, etc.). Further, for example, a pronunciation of the letter "s" in the word "sing" corresponds to the voiceless (unvoiced) phone [s], and the articulation thereof may not cause the vocal cords to vibrate similarly.

Thus, in some examples, the voice selection unit 226 may determine the intelligibility metric by analyzing the acoustic feature parameters of speech sounds associated with different voices to determine the noise representations for the different voices. In turn, for example, the voice selection unit 226 may determine the intelligibility metric by comparing noise representations associated with different voices, at least for such speech sounds (e.g., aspirates, fricatives, etc.). Similarly, in some examples, the naturalness of a speech sound may be determined based on the acoustic feature parameters of the speech sound.

Thus, in some examples, the voice selection unit 226 may utilize the naturalness metric and/or the intelligibility metric to further reduce the number of voices in the set of distinct voices used by the voice assignment unit 224. In an example scenario, the voice selection unit 226 may first select voices that have a naturalness metric indicating naturalness that is greater than a threshold naturalness (e.g., MOS score greater than 70%, etc.). Next, in the scenario, the voice selection unit 226 may then filter out, from within the selected threshold naturalness voices, voices that have an intelligibility metric indicating intelligibility that is greater than a threshold intelligibility (e.g., MOS score greater than 60%, etc.). Next, in the scenario, the voice selection unit 226 may then select, from within the threshold natural and threshold intelligible voices, the set of distinct voices that have a similarity metric indicating similarity that is less than a threshold similarity (e.g., MOS score less than 30%, etc.). Other scenarios and threshold values are possible as well.

In some examples, analysis data described above for the similarity metric, the naturalness metric, and/or the intelligibility metric may be stored in the data storage 208 or other memory accessible to the device 200. In other examples, the analysis data may be determined by the voice selection unit 226 analyzing speech sounds (or parameters thereof) represented in the speech dataset 210, transform dataset 212, and/or provided by the voice generation unit 222.

The speech synthesis unit 228 may be configured to receive a request for provision of speech content. The request, for example, may be received via the input interface 202 or may be received from an application of the device 200 (not shown) similar to the applications 104a and 104b of the device 100, among other possibilities. In turn, the speech synthesis unit 228 may be configured to responsively generate speech (e.g., via the output interface 104, etc.) that has particular voice characteristics of a particular voice assigned to the source of the requested speech output by the voice assignment unit 224.

In some examples, the speech synthesis unit 228 may utilize a vocoder to provide modified speech sounds of the speech dataset 210 (or sounds generated by the voice generation unit 222) according to the particular voice characteristics of the assigned particular voice. Example vocoders that may be utilized by the speech synthesis unit 128 may include sinusoidal vocoders (e.g., AhoCoder, Harmonic-plus-Noise Model (HNM) vocoder, Sinusoidal Transform Codec (STC), etc.) and/or non-sinusoidal vocoders (e.g., STRAIGHT, etc.).

It is noted that functional blocks of FIG. 2 are illustrated for convenience in description. In some embodiments, the device 200 may be implemented using more or less components configured to perform the functionalities described above. For example, the voice generation unit 222, the voice assignment unit 224, the voice selection unit 126, and/or the speech synthesis unit 228 may be implemented as one, two, or more software components. Further, in some examples, components of the device 200 may be physically implemented in one or more computing devices according to various applications of the device 200. For example, the speech dataset 210 may be included in a remote computing device (e.g., server) accessible by the device 200. Other configurations are possible as well.

Figure 3:
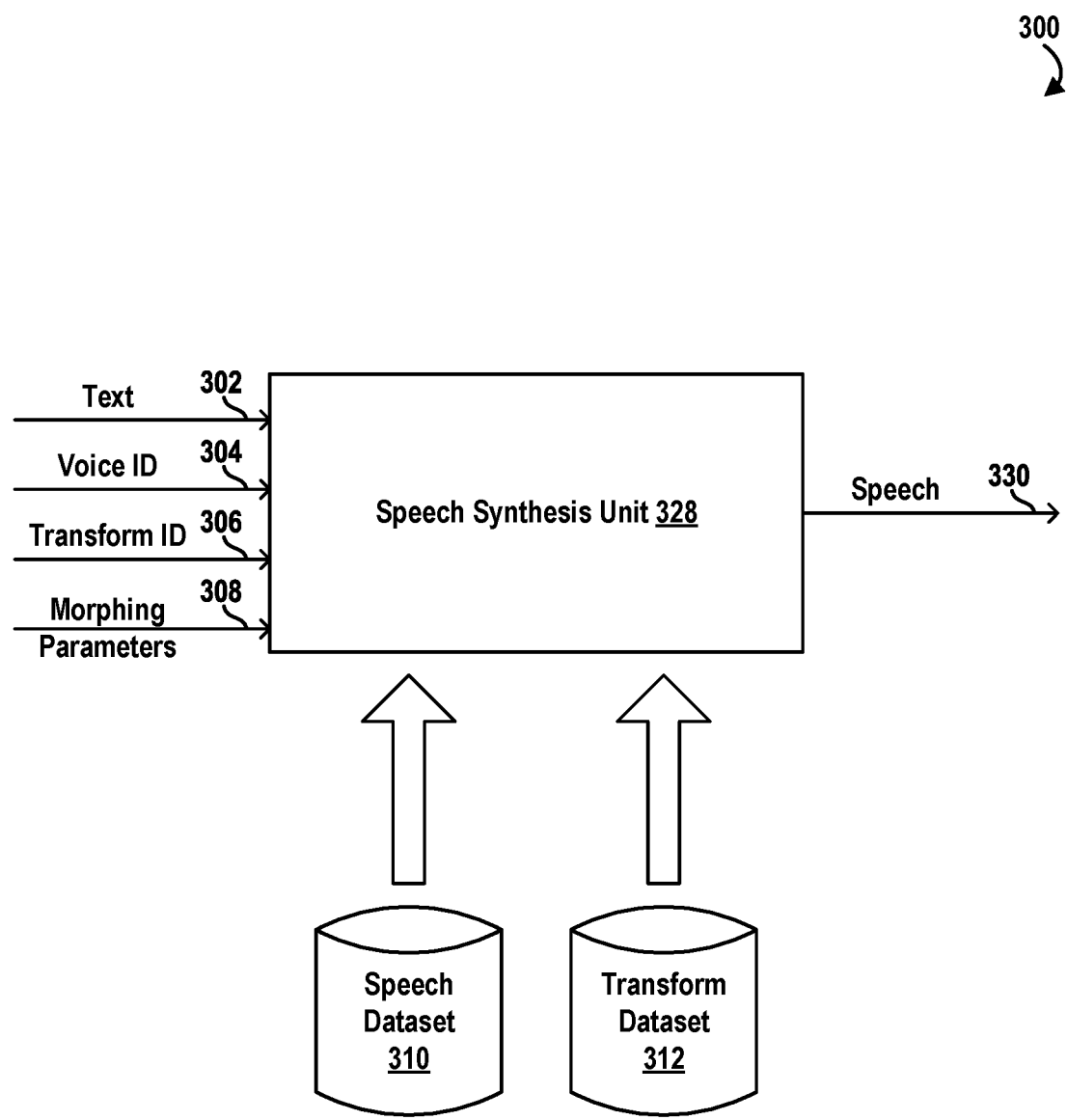
FIG. 3 is a block diagram of a text-to-speech synthesis system, according to an example embodiment.

FIG. 3 is a block diagram of a text-to-speech synthesis system 300, according to an example embodiment. The system 300 shown in FIG. 3 presents an embodiment of a system that could be used with the devices 100 and/or 200, for example. As shown, the system 300 includes a speech dataset 310, a transform dataset 312, and a speech synthesis unit 328 that are similar, respectively, to the speech dataset 210, the transform dataset 212, and the speech synthesis unit 228 of the device 200. However, in some examples, the system 300 may include more or fewer components than those shown. For instance, the system 300 may alternatively not include the transform dataset 312.

Further, as shown, the speech synthesis unit 328 may be configured to receive inputs including text 302, voice ID 304, transform ID 306, and morphing parameters 308. However, in some examples, the system 300 may receive fewer or additional inputs than those shown. For instance, where the transform dataset 312 is not included in the system 300 or where the system 300 does not support the morphing parameters 308, the system 300 may alternatively not include the transform ID 306 or the morphing parameters 308. Further, as shown, the TTS system 300 provides a synthetic speech signal 330.

The text 302 may include any text provided by a source of information such as a particular application (e.g., email application, calendar application, application 104a of the device 100, etc.), an operating system (e.g., operating system 108 of the device 100, etc.), a particular area within a display of a device (e.g., an area within a visual user interface, etc.), or a particular graphical user interface (GUI) object (e.g., text box, button, sliding bar, etc.), among other possibilities.

The voice ID 304 may include any identification code for identifying speech sounds represented in the speech dataset 310 that have particular voice characteristics of a particular voice. For example, the voice ID 304 may be provided to the speech synthesis 328 by the voice assignment unit 224 of the device 200 to specify the particular voice in the speech dataset 310 that the speech synthesis unit 328 should use to provide the output speech 330.

The transform ID 306 may include any identification code (or no identification code) for a particular transform in the transform dataset 312. Similarly to the voice ID 304, the transform ID 306 may be provided by the voice assignment unit 224.

The morphing parameters 308 may include morphing parameters generated by the voice generation unit 222 of the device 200 and assigned to the source of the text 302 by the voice assignment unit 224.

The output speech 330 may include a pronunciation of the text 302 that has the particular voice characteristics of a particular voice according to the voice ID 304, the transform ID 306, and/or the morphing parameters 308.

As an example scenario for the operation of the system 300, referring back to FIG. 2, the device 200 may identify the source of the text 302, and provide the text 302 to the speech synthesis unit 328. Next, the voice assignment unit 224 may assign the particular voice characteristics of a particular voice to the identified source of the text 302. In one instance, if the source is assigned a voice from within the speech dataset 310, the voice assignment unit 224 may provide the voice ID 304 of the particular voice. In another instance, where the assigned voice is a transformed voice, the voice assignment unit 224 may provide the transform ID 306 in addition to the voice ID 304 to select a particular transform from within the transform dataset 312. In yet another instance, where the assigned voice is a morphed voice based on a voice in the speech dataset 310, the voice assignment unit 224 may provide the morphing parameters 308 in addition to the voice ID 304. In still another example, where the assigned voice is a morphed voice based on a transformed voice, the voice assignment unit 224 may provide the voice ID 304, the transform ID 306, and the morphing parameters 308.

Next, in the scenario, the speech synthesis unit may then generate the speech signal 330 that is a pronunciation of the text 302 having particular voice characteristics of the particular voice specified according to the voice ID 304, the transform ID 306, and/or the morphing parameters 308. For instance, the speech signal 330 may be provided to the output interface 204 (e.g., speaker) that provides the audio pronunciation of the text 302 having the particular voice characteristics of the particular voice. Other scenarios are possible as well.

Figure 4:
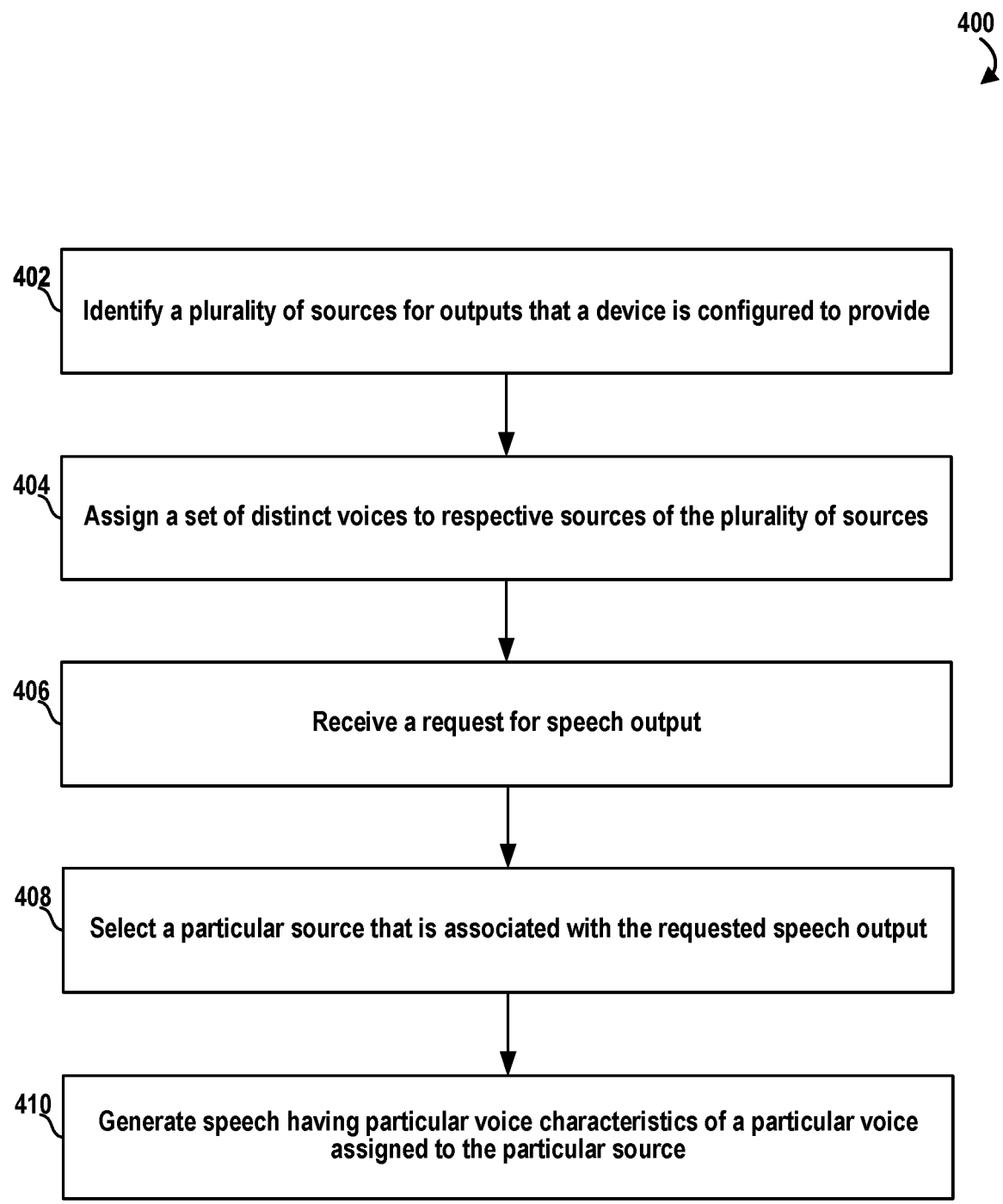
FIG. 4 is a block diagram of a method, according to an example embodiment.

FIG. 4 is a block diagram of a method 400, according to an example embodiment. Method 400 shown in FIG. 4 presents an embodiment of a method that could be used with the devices 100, 200, and/or the system 300, for example. Method 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In some examples, for the method 400 and other processes and methods disclosed herein, each block may represent circuitry that is wired to perform the specific logical functions in the process.

At block 402, the method 400 involves identifying a plurality of sources for outputs that a device is configured to provide. The plurality of sources, for example, may include applications in the device (e.g., applications 104a and 104b of the device 100, etc.), an operating system of the device (e.g., operating system 108 of the device 100, etc.), areas within a display of the device (e.g., notification area, center area, etc.), I/O components of the device (e.g., physical button, etc.), or graphical user interface (GUI) objects in a display of the device (e.g., text box, button, etc.), among other possibilities.

In some examples, the method 400 may also involve identifying contexts of information provided by one or more of the plurality of sources. In one instance, a context may be indicative of font characteristics of text associated with a particular source (e.g., font size, color, bold setting, italics setting, capitalization, etc.). In another instance, the context may be indicative of a type of content in the text. For example, the text may include an email address, a title, a body, a conclusion, among other possibilities. In yet another instance, the context may be indicative of an author of the text (e.g., messages between two or more persons, summary authored by one person and body authored by another person, etc.). In still another instance, the context may be indicative of a type of a particular source (e.g., sliding bar, button, text box, image editing type of application, social network type of application, etc.). In still another instance, the context may be indicative of a status of the particular source or a status of the device (e.g., battery level of device, network conditions, empty text box, filled text box, etc.). In still another instance, the context may be indicative of a location of the source (e.g., center of screen, side of device, back of device, etc.). Other contexts are possible as well in line with the discussion above.

At block 404, the method 400 involves assigning a set of distinct voices to respective sources of the plurality of sources. A voice assigned to one source is characterized by voice characteristics different from voice characteristics of other voices assigned to other sources.

In some examples, where a particular source may provide speech outputs having more than one context, the method 400 may also involve determining a context of the requested speech output, and assigning at least two voices of the set of distinct voices to the particular source. By way of example, a calendar application may have a first voice assigned for notifications of upcoming appointments within one hour, a second voice (e.g., morphed voice with a lower pitch, etc.) for notifications of upcoming appointments within one week, etc.

In some examples, the method 400 may also involve obtaining voice data associated with a plurality of voices. For instance, the voice data may include speech sounds (or parameters thereof) similar to the speech sounds in the speech dataset 210, transforms similar to transforms in the transform dataset 212, or morphing parameters similar to the morphing parameters 308 of the system 300. In these examples, the method 400 may also involve determining a similarity metric characterizing similarity between the plurality of voices based on the voice data. In one instance, the voice data may include subjective similarity comparison data (e.g., MOS, etc.) in line with the discussion of the voice selection unit 226. In another instance, a device of the method 400 may compare speech sounds (or parameters thereof) of a first voice with speech sounds (or parameters thereof) of a second voice (e.g., original voice, transformed voice, morphed voice, etc.) in line with the discussion of the voice selection unit 226 of the device 200. In both instances, the method 400 may determine the similarity metric such as a ranking of respective voice pairs that are ordered according to a degree of similarity between the voice pairs. In these examples, the method 400 may also involve selecting the set of distinct voices of the block 404 from within the plurality of voices based on the similarity metric indicating similarity between the set of distinct voices being less than a threshold. For instance, a device of the method 400 may select a small or minimal number of the most distinct voices for inclusion in the set of distinct voices of the block 404.

In some examples, the method 400 may also involve determining a quantity of the plurality of sources (and/or contexts thereof) identified at block 402, and determining the threshold for the similarity between the set of distinct voices based on the quantity. For instance, where the user interface includes only includes four contexts, the threshold may be determined such that the set of distinct voices includes the four most dissimilar voices from within the plurality of voices.

Further, in some examples, the selection of the set of distinct voices of block 404 may be based also on a naturalness metric and/or an intelligibility metric in line with the description of the voice selection unit 226 of the device 200. Thus, in some examples, the method 400 may also involve determining a naturalness metric characterizing acoustic transitions between speech sounds having a given voice of the plurality of voices based on the voice data, and selecting the set of distinct voices based also on the naturalness metric indicating naturalness of the set of distinct voices being greater than a given threshold. Additionally or alternatively, in some examples, the method 400 may also involve determining an intelligibility metric characterizing cognitive perception of speech sounds having the given voice based on the voice data, and selecting the set of distinct voices based also on the intelligibility metric indicating intelligibility of the set of distinct voices being greater than a given threshold.

In line with the description of the voice generation unit 222 of the device 200, in some examples, the method 400 may also involve determining morphing parameters associated with one or more of a tonality, duration, frequency, or quality of a given voice. For instance, the voice data may indicate voice characteristics of one or more voices (e.g., speech dataset 210 of the device 200, etc.). Thus, in these examples, the method 400 may involve determining one or more additional voices based on the morphing parameters, and determining the plurality of voices to include the one or more additional voices. In turn, for instance, selecting the set of distinct voices may be from within the determined plurality of voices that includes the one or more voices indicated in the voice data as well as the one or more additional voices determined based on the morphing parameters.

Similarly to the discussion of the voice generation unit 222 of the device 200, in some examples, the method 400 may also involve receiving one or more transforms (e.g., transform dataset 212 of the device 200). A given transform, for instance, may be configured to associate a first voice of the one or more voices with a second voice other than the one or more voices. Thus, in these examples, the method 400 may also involve determining one or more additional voices based on the one or more transforms, and determining the plurality of voices to include the one or more additional voices.

At block 406, the method 400 involves receiving a request for speech output. In one instance, the request may be based on an input (e.g., user input requesting an output of an application, etc.). In another instance, the request may be received from an application and/or any other source (e.g., operating system, etc.) in the device. For example, a weather application may request the device to provide the speech output notifying a user that a weather update was received.

At block 408, the method 400 involves selecting a particular source, from within the plurality of sources, which is associated with the requested speech output. For instance, the device may identify a particular application (e.g., calendar application, etc.) that is configured to provide information associated with the speech output requested at block 406. Additionally or alternatively, in some examples, the method 400 may also involve selecting a particular context for the requested speech output, in line with the discussion above.

At block 410, the method 400 involves generating, for the requested speech output, speech having particular voice characteristics of a particular voice assigned to the particular source. By way of example, the device may be configured to provide a synthetic speech pronunciation of the time of day based on information from a clock application (i.e., the particular source). In this example, the device may generate the speech output with a first voice if the time of day is in the morning hours (i.e., first context), and the speech output with a second voice if the time of day is in the afternoon hours (i.e., second context). Other examples are possible as well.

Figure 5A:
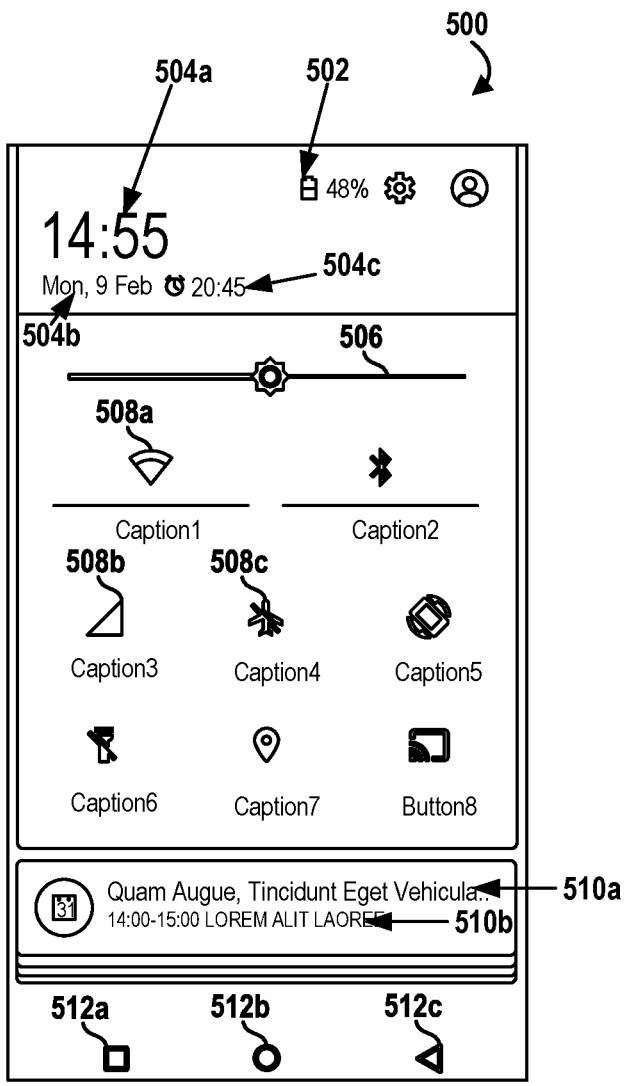
FIG. 5A illustrates a user interface, according to an example embodiment.
Figure 5B:
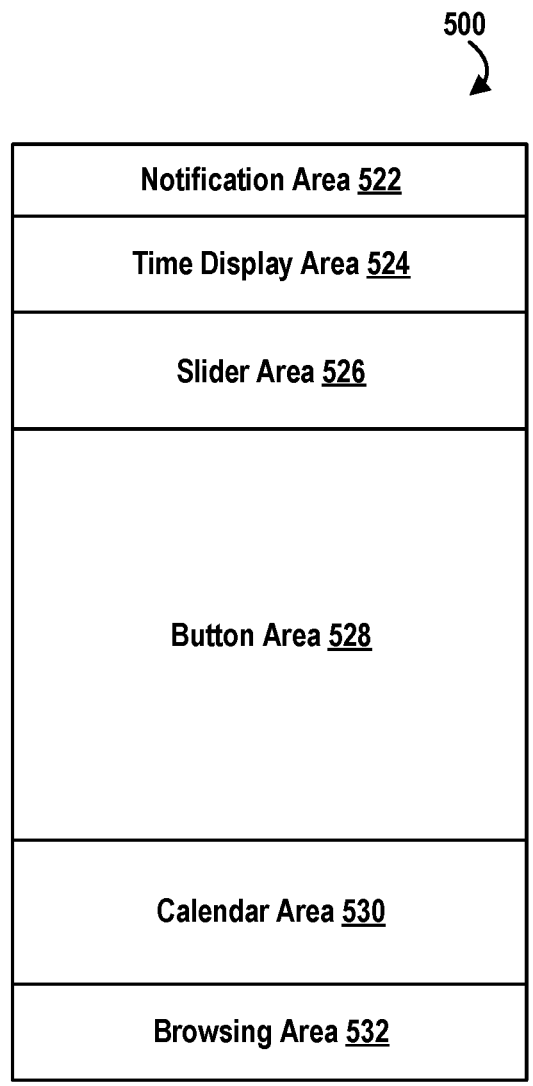
FIG. 5B is a block diagram illustrating various areas of the user interface of FIG. 5A.

FIG. 5A illustrates a user interface (UI) 500, according to an example embodiment. FIG. 5B is a block diagram illustrating various areas of the user interface 500 of FIG. 5A. The UI 500 is an example UI that can be used with the devices 100, 200, the system 300, and/or the method 400. As shown, the UI 500 includes a notification area 522, a time display area 524, a slider area 526, a button area 528, a calendar area 530, and a browsing area 532. However, other areas are possible as well in accordance with the present disclosure.

As shown, the notification area 522 includes one or more sources of information for notifications such as battery level 502. The time display area 524 includes information such as a time 504a, a day 504b, and an upcoming alarm 504c. The slider area 526 includes a slider bar 506. The button area 528 includes several buttons exemplified by buttons 508a, 508b, and 508c. The calendar area 530 includes an item title 510a and item details 510b. The browsing area 532 includes browsing buttons 512a-512c. It is noted that the various contents of the areas 522-532 are for exemplary purposes only. Other sources/information contexts are possible as well in line with the discussion above.

In some examples, the UI 500 may be displayed on a display of a device such as the display 102 of the device 100. However, in other examples, the UI 500 may include sources of information from more than one component of a device. For instance, the browsing area 532 may be implemented as physical inputs (e.g., buttons) that are independent from the display of the device, and the areas 522-530 may be visually displayed on the display. Other configurations are possible as well.

FIGS. 5A-5B illustrate various scenarios for a speech-based user interface in accordance with the present method.

In one scenario, a device of the UI 500 may be operating in a hands-free mode. In this scenario, the UI 500 may provide various speech outputs from various sources of the device with a distinct voice rather than narrate the source of the speech output. For instance, rather than generating speech that says "from the calendar application: you have an upcoming appointment titled," along with a pronunciation of the item title 510a, the device may alternatively generate the pronunciation of the item title 510a with a distinct voice such that the user may recognize the source of the item title 510a as the calendar application without narrating the source. As a variation of the scenario, the device of the UI 500 may generate speech with different voices according to time remaining for the appointment. For instance, the device may parse the item details 510b to determine the time remaining, and may adjust a particular voice characteristic (e.g., tonality, pitch, duration, harshness, etc.) to convey the context (i.e., time remaining) to the user without particularly narrating the time remaining. Thus, the present method allows transmission of context information to a user of the UI 500 by assigning distinct voices to various contexts of the information associated with the generated speech output.

In another scenario, a device of the UI 500 may be operating in a multi-modal mode where speech output is generated concurrently with another type of output (e.g., haptic, visual, etc.). For instance, in the scenario, the slider bar 506 may adjust brightness of the UI 500. Thus, for instance, a user may adjust the slider bar 506 and visually inspect the change in brightness as well as receive a speech output that specifies the brightness percentage. By assigning a distinct voice to the slider bar 506 the user may perceive that the percentage indicated in the generated speech is the brightness percentage and not the percentage of battery power remaining (e.g., battery level 502) without the device expressly narrating "the brightness level is xx %," etc.

In yet another scenario, a device of the UI 500 may be operating in an accessibility mode. For instance, a user of the device may be visually impaired or may request speech outputs (e.g., driver of a car, etc.) to communicate with the device. In this scenario, the device of the UI 500 may assign a distinct voice to each of the areas 522-532. In turn, for instance, the user may perceive the source/context of speech outputs such as notifications from the notification area 522, or a recitation of the caption of button 508b, or a location of the slider bar 506, etc., without an express narration of the source/context. For instance, the user may select the button 508a, and the device may generate speech pronouncing "Caption1" with a distinct voice, rather than "this is the button area, you selected a button having Caption1." The context/source information in this instance may be perceived by the user associating the distinct voice with a particular context/source. Other scenarios are possible as well in accordance with the present disclosure.

FIG. 6 depicts an example computer-readable medium configured according to at least some embodiments described herein. In example embodiments, the example system can include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. method 400) can be implemented by computer program instructions encoded on a computer readable storage media in a machine-readable format, or on other media or articles of manufacture (e.g., the applications 104a, 104b, the API 106, the OS 108, the program instructions 220, or the speech synthesis unit 328). FIG. 6 is a schematic illustrating a conceptual partial view of an example computer program product that includes a computer program for executing a computer process on a computing device, arranged according to at least some embodiments disclosed herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 can be a computer-readable medium 606, such as, but not limited to, a hard disk drive, a Compact Disc (CD), a Digital Video Disk (DVD), a digital tape, memory, etc. In some implementations, the signal bearing medium 602 can be a computer recordable medium 608, such as, but not limited to, memory, read/write (R/W) CDs, R/W DVDs, etc. In some implementations, the signal bearing medium 602 can be a communication medium 610 (e.g., a fiber optic cable, a waveguide, a wired communications link, etc.). Thus, for example, the signal bearing medium 602 can be conveyed by a wireless form of the communications medium 610.

The one or more programming instructions 604 can be, for example, computer executable and/or logic implemented instructions. In some examples, a computing device, such as the processor-equipped devices 100 and/or 200, may be configured to provide various operations, functions, or actions in response to the programming instructions 604 conveyed to the computing device by one or more of the computer readable medium 606, the computer recordable medium 608, and/or the communications medium 610. In other examples, the computing device can be an external device in communication with a device such as the devices 100 and/or 200.

The computer readable medium 606 can also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server. For example, the computer program product 600 can implement the functionalities discussed in the description of FIGS. 1-5.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method comprising:
   determining that a similarity between a particular set of one or more voice characteristics and another set of one or more voice characteristics associated with a different application satisfies a threshold difference;
   associating, by a computing device, the particular set of one or more voice characteristics with a particular application that is installed on the computing device based on determining that the similarity between the particular set of one or more voice characteristics and the another set of one or more voice characteristics associated with the different application satisfies the threshold difference;
   receiving, by the computing device, text that the particular application that is installed on the computing device has indicated is to be output as synthesized speech;
   identifying, by the computing device, the particular application that provided the text from among different applications that are installed on the computing device;
   selecting based on the particular application that was identified as having provided the text from among the different applications, by the computing device and from among multiple sets of one or more voice characteristics that are each pre-associated with a different one of the different applications that are installed on the computing device, the particular set of one or more voice characteristics that was associated with the particular application that is installed on the computing device and that has indicated that the text is to be output as synthesized speech, wherein the pre-associated multiple sets of one or more voice characteristics audibly distinguish for which of the different applications the speech is synthesized;
   generating, by the computing device, the synthesized speech using the particular set of one or more voice characteristics that was associated with the particular application that is installed on the computing device and that has indicated that the text is to be output as synthesized speech; and
   providing the synthesized speech for output.

2. The method of claim 1, wherein the particular set of one or more voice characteristics includes one or more tonality, duration, pitch, or harshness parameters.

3. The method of claim 1, comprising, before the text is received, assigning the particular set of voice characteristics to the particular application only.

4. The method of claim 3, wherein the particular set of voice characteristics is automatically assigned to the particular application.

5. The method of claim 3, wherein the particular set of voice characteristics is manually assigned to the particular application.

6. The method of claim 1, wherein the particular set of one or more voice characteristics comprises a set of one or more transforms.

7. The method of claim 1, wherein the particular set of one or more voice characteristics comprises a set of one or more voice samples.

8. The method of claim 1, wherein the particular set of one or more voice characteristics comprises a set of acoustic feature parameters.

9. A non-transitory computer-readable storage device having instructions stored thereon that, when executed by a computing device, cause the computing device to perform operations comprising:
- determining that a similarity between a particular set of one or more voice characteristics and another set of one or more voice characteristics associated with a different application satisfies a threshold difference;
- associating, by a computing device, the particular set of one or more voice characteristics with a particular application that is installed on the computing device based on determining that the similarity between the particular set of one or more voice characteristics and the another set of one or more voice characteristics associated with the different application satisfies the threshold difference;
- receiving, by the computing device, text that the particular application that is installed on the computing device has indicated is to be output as synthesized speech;
- identifying, by the computing device, the particular application that provided the text from among different applications that are installed on the computing device;
- selecting based on the particular application that was identified as having provided the text from among the different applications, by the computing device and from among multiple sets of one or more voice characteristics that are each pre-associated with a different one of the different applications that are installed on the computing device, the particular set of one or more voice characteristics that was associated with the particular application that is installed on the computing device and that has indicated that the text is to be output as synthesized speech, wherein the pre-associated multiple sets of one or more voice characteristics audibly distinguish for which of the different applications the speech is synthesized;
- generating, by the computing device, the synthesized speech using the particular set of one or more voice characteristics that was associated with the particular application that is installed on the computing device and that has indicated that the text is to be output as synthesized speech; and
- providing the synthesized speech for output.

10. The device of claim 9, wherein the particular set of one or more voice characteristics includes one or more tonality, duration, pitch, or harshness parameters.

11. The device of claim 9, the operations comprising, before the text is received, assigning the particular set of voice characteristics to the particular application only.

12. The device of claim 11, wherein the particular set of voice characteristics is automatically assigned to the particular application.

13. The device of claim 11, wherein the particular set of voice characteristics is manually assigned to the particular application.

14. The device of claim 9, wherein the particular set of one or more voice characteristics comprises a set of one or more transforms.

15. The device of claim 9, wherein the particular set of one or more voice characteristics comprises a set of one or more voice samples.

16. The device of claim 9, wherein the particular set of one or more voice characteristics comprises a set of acoustic feature parameters.

17. A system comprising:
- one or more processors; and
- one or more computer-readable devices including instructions that, when executed by the one or more processors, cause performance of operations including:
  - determining that a similarity between a particular set of one or more voice characteristics and another set of one or more voice characteristics associated with a different application satisfies a threshold difference;
  - associating, by a computing device, the particular set of one or more voice characteristics with a particular application that is installed on the computing device based on a determining that the similarity between the particular set of one or more voice characteristics and the another set of one or more voice characteristics associated with the different application satisfies the threshold difference;
  - receiving, by the computing device, text that the particular application that is installed on the computing device has indicated is to be output as synthesized speech;
  - identifying, by the computing device, the particular application that provided the text from among different applications that are installed on the computing device;
  - selecting based on the particular application that was identified as having provided the text from among the different applications, by the computing device and from among multiple sets of one or more voice characteristics that are each pre-associated with a different one of the different applications that are installed on the computing device, the particular set of one or more voice characteristics that was associated with the particular application that is installed on the computing device and that has indicated that the text is to be output as synthesized speech, wherein the pre-associated multiple sets of one or more voice characteristics audibly distinguish for which of the different applications the speech is synthesized;
  - generating, by the computing device, the synthesized speech using the particular set of one or more voice characteristics that was associated with the particular application that is installed on the computing device and that has indicated that the text is to be output as synthesized speech; and
  - providing the synthesized speech for output.

18. The method of claim 1, wherein selecting based on the particular application that was identified as having provided the text from among the different applications, by the computing device and from among multiple sets of one or more voice characteristics that are each pre-associated with the different applications that are installed on the computing device, the particular set of one or more voice characteristics that was associated with the particular application that is installed on the computing device and that has indicated that the text is to be output as synthesized speech comprises:
- selecting the particular set of one or more voice characteristics that is pre-associated with the particular application instead of another set of one or more voice characteristics that is pre-associated with another application.

19. The method of claim 1, wherein associating, by the computing device, a particular set of one or more voice characteristics with a particular application that is installed on the computing device based on determining that the similarity between the particular set of one or more voice characteristics and the another set of one or more voice characteristics associated with the different application satisfies the threshold difference is in response to determining, by the computing device, that the particular set of one or more voice characteristics are audibly distinguishable from the another set of one or more voice characteristics.

* * * * *